United States Patent [19]

Sauer

[11] Patent Number: 5,341,910
[45] Date of Patent: Aug. 30, 1994

[54] APPARATUS FOR TURNING FLAT OBJECTS

[75] Inventor: Hartmut K. Sauer, Himmelstadt, Fed. Rep. of Germany

[73] Assignee: De La Rue Giori S.A., Lausanne, Switzerland

[21] Appl. No.: 126,535

[22] Filed: Sep. 24, 1993

[30] Foreign Application Priority Data

Oct. 29, 1992 [CH] Switzerland ............... 3372/92

[51] Int. Cl.$^5$ ............................................. B65G 47/24
[52] U.S. Cl. ....................................... 198/403; 198/409
[58] Field of Search ......................... 198/402, 403, 409

[56] References Cited

U.S. PATENT DOCUMENTS

| | | | |
|---|---|---|---|
| 1,777,361 | 10/1930 | Gottschalk | 198/402 X |
| 2,534,221 | 12/1950 | Brokmann | 198/402 |
| 3,070,934 | 1/1963 | Du Broff | 198/403 X |
| 3,410,198 | 11/1968 | Lohr et al. | 198/402 X |
| 3,887,066 | 6/1975 | Houtsager | 198/403 |
| 3,939,854 | 2/1976 | Kitterman et al. | 198/403 X |
| 3,973,673 | 8/1976 | Ahluwalia | 198/403 X |
| 4,009,775 | 3/1977 | Wolfelserger et al. | 198/403 X |
| 5,143,197 | 9/1992 | Sauer | 198/403 X |

FOREIGN PATENT DOCUMENTS 0048115 4/1980 Japan ......................... 198/403

*Primary Examiner*—D. Glenn Dayoan

*Attorney, Agent, or Firm*—Kane, Dalsimer, Sullivan, Kurucz, Levy, Eisele & Richard

[57] ABSTRACT

On the conveyor track (1) on which the objects (2a, 2b) to be turned are moved at an equal distance apart by slides (3a, 3b), there is provided along a turning zone an advancement mechanism having an advancement member in the form of a spring bar (5), which is periodically moved, at an accelerated speed relative to the speed of conveyance, forward out of an initial position into an end position and back again into the initial position. The spring bar (5) disposed over the conveyor track (1) has a bent section (5b) which reaches down to the conveyor track and the concave side of which points in the direction of conveyance. Between the two aforementioned positions of the spring bar (5), there are fastened on the conveyor track (1) two stops (6) which are aligned in the transverse direction and the height of which is less than the height of the object and the side of which pointing oppositely to the direction of conveyance exhibits in its upper region an inclined face (6a). Thee arrangement is made such that an object (2b) isundergripped at its rear edge by the end (5c) of the bent spring section (5b), pushed forward at an accelerated speed against the stops (6), then raised up at the rear and, guided within the bent spring section, tilted forwards over the stop and deposited, turned under the influence of the spring force of the spring bar, on the conveyor track, whereupon it is taken up again by the original slides (3a).

22 Claims, 3 Drawing Sheets

APPARATUS FOR TURNING FLAT OBJECTS

FIELD OF THE INVENTION

The invention relates to an apparatus for turning flat objects such as, for example, notes of value parcels.

PRIOR ART

An apparatus of this kind is described in EP-A-0 501 923.

It is sometimes necessary to turn the conveyed material which is transported on a conveyor track between two finishing bays in such a way that the original top side of the transported objects becomes the underside in order, for example, to reverse the orientation of the object or of the individual parts forming the object, in the case of notes of value parcels the notes of value, or indeed in order to change the inscription-bearing side of the bands or packings surrounding the objects relative to the conveyor track.

In the previously known turning apparatus, an over-reach-type advancement mechanism takes up an object to be turned and pushes it to a turning device in which the front edge of this object is raised up and the object is tilted sufficiently far rearwards beyond the dead center position for it to then fall back, with the original top side downwards, onto the conveyor track, where it is again taken up by the original slides of this conveyor track. This known turning apparatus operates, apart from with an advancement member, with an upwardly bent ramp, which is installed in the turning zone, and with a bent guideway adjacent thereto, which is mounted so as to be capable of tilting about a transverse axis and is provided with a counterbalance weight.

A disadvantage in this is that the counterbalance weight, which determines the tilt point, has to be adjusted exactly to the conveyed material and that the objects have to place themselves back onto the conveyor track solely under the influence of gravity. The time delay which herein arises can lead to breakdowns in the conveyor track.

SUMMARY OF THE INVENTION

The object of the present invention is to improve the known turning apparatus in such a way that, on the one hand, the constructional means which are necessary to the turning are substantially simplified and, on the other hand, a time delay in the turning is precluded, no adjustment being required moreover to the tilt point.

This object is achieved according to the invention by the features specified herein.

The apparatus is thereby not only simplified in constructional terms, but there is also the additional effect that an object, in the actual turning operation, is guided within the bent section of the elastic spring bar and, after its upright on-edge position has been passed, is deposited, turned under an adjustable spring force, on the conveyor track, the tilting of an object forwards out of its upright on-edge position being effected not only under the influence of gravity, but also under the influence of the suitably chosen spring force.

Expedient designs of the invention can be derived from the subclaims.

BRIEF DESCRIPTION OF THE DRAWINGS

The invention is explained in greater detail on the basis of an illustrative embodiment, with reference to the drawings in which.

DESCRIPTION OF THE PREFERRED EMBODIMENTS

According to FIGS. 1 to 4, flat objects, in the considered example banded notes of value parcels 2a, 2b, 2c, are transported by means of slides 3a, 3b, 3c, which move at constant speed in the direction of the arrow F1 and push against the rear edge of the notes of value parcels. These slides 3a, 3b, 3c are fastened, at an equal distance apart, to a chain (not represented), which is disposed beneath the conveyor track 1 and is moved uniformly, and protrude with their upper ends through slots 4 (FIG. 4) beyond the plane of the conveyor track 1.

Figure 1:
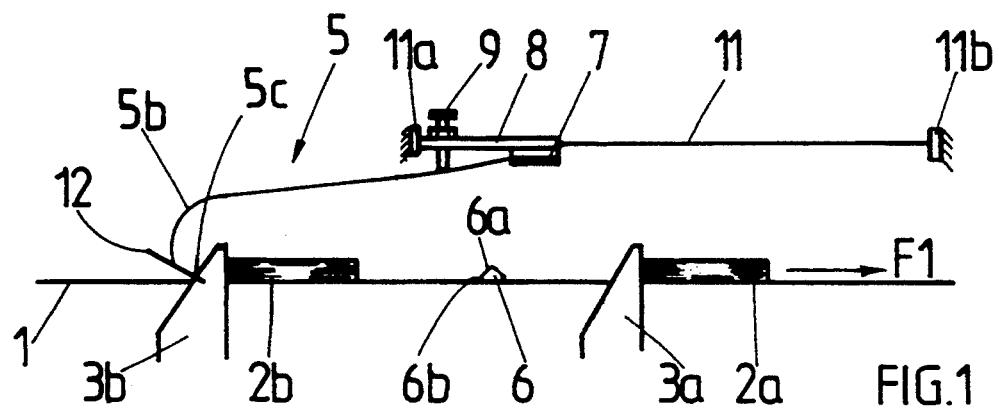
FIGS. 1 to 3 show schematic, simplified side views of an apparatus according to the invention, three different phases of the turning operation being illustrated.
Figure 2:
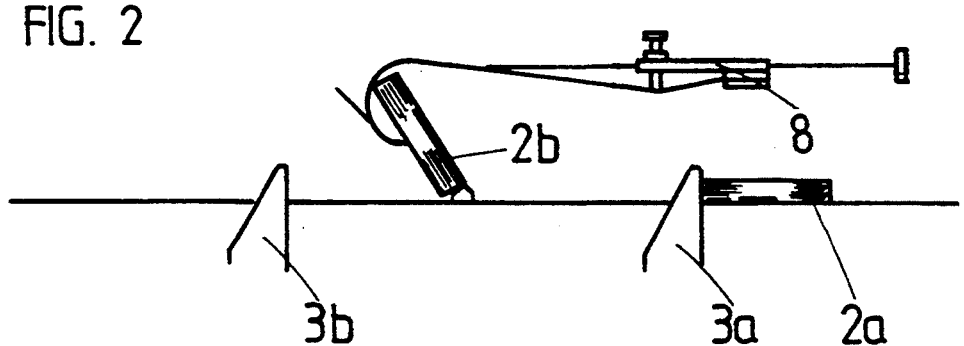
Figure 3:
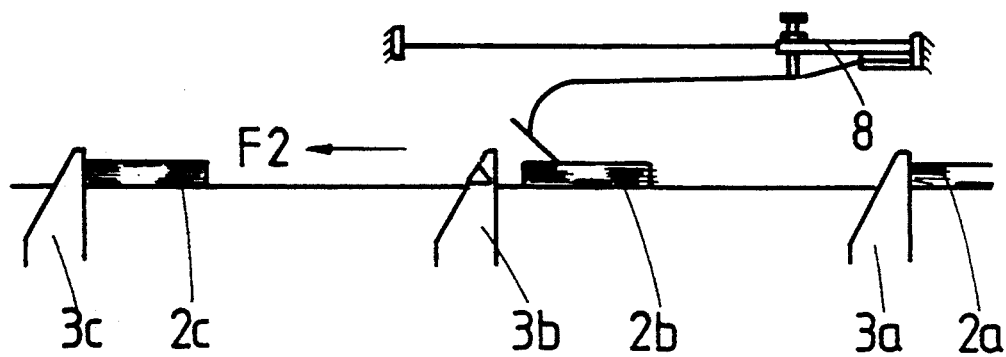
Figure 4:
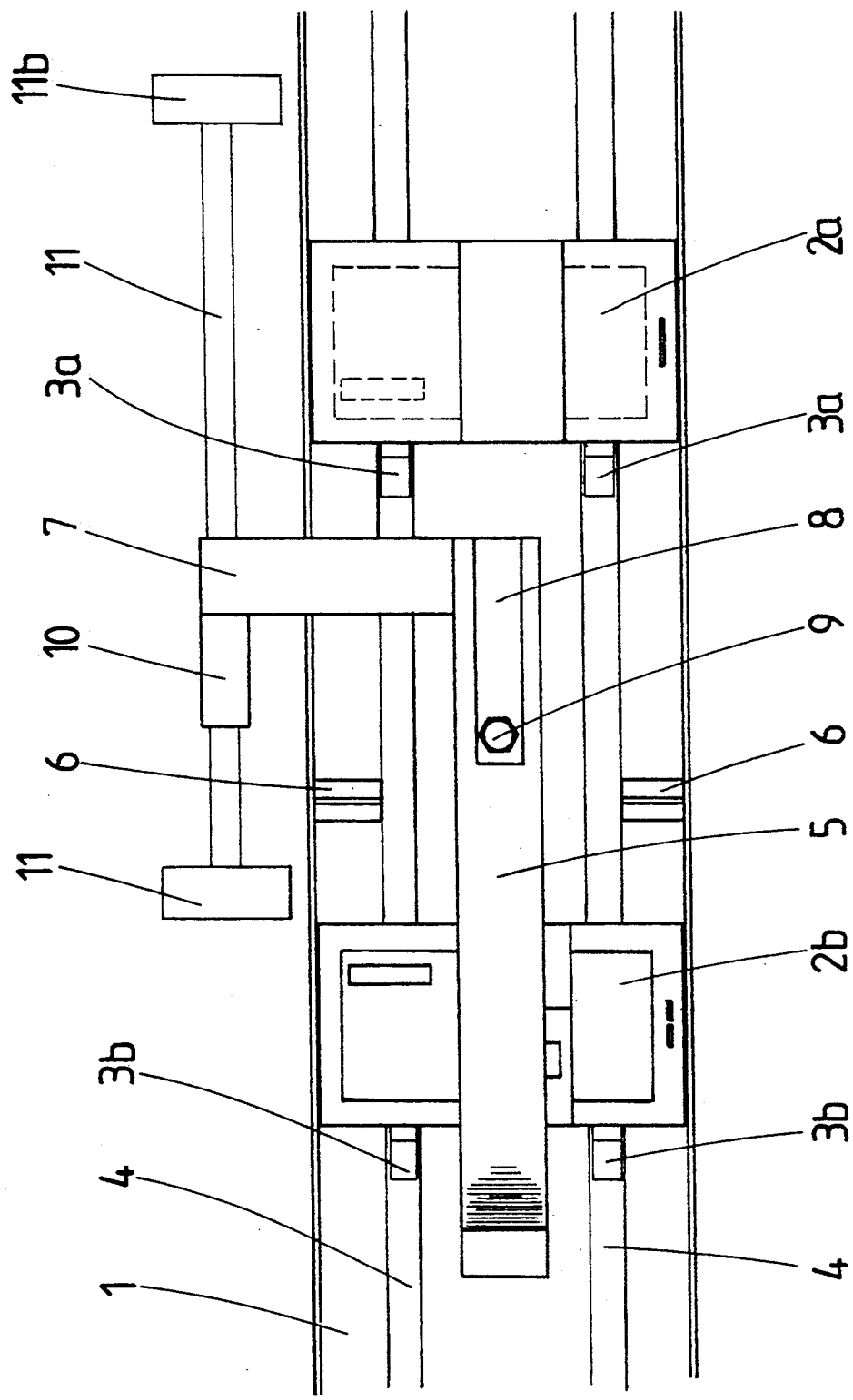
FIG. 4 shows a top view of the apparatus in enlarged representation.

Along the turning zone represented in FIGS. 1 to 4, there is located an advancement mechanism, which accelerates the notes of value parcels and exhibits an advancement member in the form of a spring bar 5, which is located above the conveyor track 1 and is clamped by its end pointing in the direction of conveyance to a tie-bar 7 jutting over the conveyor track. As is shown in FIG. 4, this tie-bar 7 extends transversely to the direction of conveyance beyond the one side of the conveyor track 1 and is fastened to a sliding unit 10. This sliding unit is displaceable to and fro, along a fixed-mounted guide rod 11 running parallel to the conveyor track 1, between a rear stop 11a and a front stop 11b. The sliding unit 10 in question can be a sleeve through which the guide rod 11 projects. In this way, the spring bar 5 is able to move to and fro above the conveyor track 1, parallel to this, between an initial position, which is shown in FIG. 1 and is defined by the stop 11a, and an end position, which is shown in FIG. 3 and is defined by the stop 11b.

In FIG. 1, the notes of value parcel 2a is already turned, whereas the following notes of value parcel 2b occupies a position shortly prior to being taken up by the spring bar 5. In FIG. 2, the notes of value parcel 2b is in the turning phase and in FIG. 3 it has fallen back, having just been turned, onto the conveyor track.

Starting from its clamping end, the spring bar 5 has an essentially rectilinear section 5a extending approximately parallel to the conveyor track 1 and merging into a downwardly bent section 5b, the concave side of which points in the direction of conveyance and which reaches down to the conveyor track. This bent spring section 5b has essentially a circular-arc shape and is of such a length that its end 5c resting upon the conveyor track 1 forms a small angle with the plane of the conveyor track, so that this spring end 5c, when the advancement of a notes of value parcel is accelerated, is able to under-grip the latter's rear edge. In the normal state, i.e. outside the actual turning phase, the rectilinear spring section 5a is preferably inclined somewhat downwards, as is shown in FIG. 1. By virtue of a pretensioning device in the form of a screw 9, which is fitted to a small plate 8 fastened to the tie-bar 7, the spring bar 5 can be pretensioned downwards. Using this screw 9,, which acts at a small distance from the clamping end of the spring bar 5 upon the section 5a of the said spring bar, the pretensioning of the spring bar and hence the force with which the spring end 5c is forced downwards or against the conveyor track 1 can thus be adjusted.

As is shown in FIG. 4, the spring bar 5 is located at least approximately in the middle above the conveyor track 1 between the two slots 4 and can have a width of especially 15 to 30%, preferably around 20%, of the dimension of the notes of value parcel transversely to the direction of conveyance.

For the realization of the actual turning operation, there are provided on the conveyor track 1 two stops 6, which are fastened at a distance apart on the two lateral regions of the conveyor track 1, outside the two slots 4, and are mutually aligned in the transverse direction. As is shown in FIGS. 1 to 3, the distance of the stops 6 from the initial position of the spring end 5c (FIG. 1) is approximately twice as great as the distance to the end position of this spring end (FIG. 3). Each stop 6 has the shape of a prism, the vertical line of which lies transversely to the direction of conveyance and which, starting from this vertical line, exhibits faces 6a which are inclined on both sides and thereto adjoining faces 6b which are oriented perpendicular to the plane of conveyance. The height of a stop can measure ½ to 9/10 of the height of a notes of value parcel lying flat on the conveyor track, i.e. of the thickness of this notes of value parcel, but is preferably chosen at around ⅔ of the thickness of the notes of value parcel. The angle which the aforementioned inclined surfaces 6a of the prism form with the plane of conveyance can lie between 30° and 60° and preferably measures around 45°. Those faces 6b of the stops oriented perpendicular to the plane of conveyance can have a height of 1/5 to 3/5 of the total height of the stop, this height preferably being chosen at around ⅓ of the total height of the stop.

In a modified form of the stops, there is no need, on the side pointing in the direction of conveyance, for any face directed perpendicular to the plane of conveyance to be present, but rather a constant, inclined face will also there be adequate.

Instead of providing two stops 6 disposed in lateral proximity to the conveyor track, just a single, centrally disposed stop can also in principle be used or a larger number of stops can be provided. It is merely important of course to ensure that, in the case of conveyor tracks having slides, the path of these slides is not obstructed by the stops.

By means of a known drive device, the tie-bar 7 periodically executes with the spring bar 5, i.e. the advancement member, a to-and-fro motion which, starting from the initial position shown in FIG. 1, runs in the direction of the arrow F1 forwards up to the end position of the spring bar 5 represented in FIG. 2 and from there, in the direction of the arrow F2, back again into the initial position. The motions to and fro of the spring bar are here accelerated in relation to the speed of conveyance of the slides 3a, 3b, 3c in such a way that the period for a full motional cycle of the advancement member is equal to the quotient of the distance between two successive slides, i.e. successive objects 2a, 2b, and the speed of conveyance. That is to say that between the two points in time in which the spring end 5c occupies two successive initial positions (FIG. 1), a slide or a notes of value parcel has just covered a path length corresponding to the distance between two succcessive slides.

The motion of the spring bar 5 is synchronized with the speed of conveyance of the slides in such a way that, in the initial position of the spring bar 5, the thrust face of a slide, in the considered example according to FIG. 1 of the slide 3b, which moves forward the notes of value parcel 2b, is located directly in front of the end 5c of the spring bar 5, which spring bar is accelerated out of its location in the forward direction F1 and realizes an overreach-type advancement for the notes of value parcel in question.

The drive device for the tie-bar 7 with the spring bar 5 is coupled to the conveyor chain moving the slides and is described in the aforementioned EP-A-0 501 923.

The diameter of the bent spring section 5b can measure 3/5 to 4/5 of the dimension of a notes of value parcel in the direction of conveyance, i.e. of the height of a notes of value parcel which is stood on edge, preferably about 2/3 of this dimension. The effect of this is that the spring bar 5 is bent upwards in the turning operation and is thereupon more strongly clamped. In addition, the height H of the spring point acted upon by the pretensioning device, in the considered example the screw 9, above the plane of conveyance (FIG. 5), i.e. the height of the spring pressure point, is chosen to be somewhat lower than the height of the notes of value parcel stood on edge in the turning operation. In the event of the notes of value parcels being bundles of bank notes, H is 5 to 15 mm, preferably around 10 mm, less than the height of the notes of value parcel standing on edge. This height H determines therefore the deflection of the rectilinear section 5a of the spring bar in the turning operation and hence the spring force which acts upon the notes of value parcel when it passes the on-edge position.

If no pretensioning device acting upon the rectilinear spring section 5a is provided, then the above comments relate to the height H of the fastening point of the spring bar above the plane of conveyance.

The turning operation proceeds as follows: when the spring bar 5, after passing through its starting position, is accelerated (FIG. 1), the spring end 5c takes up the notes of value parcel 2b which has hitherto been moved by the slide 3b and which, now at an accelerated speed, is moved up to the stops 6. Here the notes of value parcel 2b hits with its front edge against the lower, perpendicular face 6b of the stops 6 and is now raised up at its back by the spring end 5c, which under-grips the rear edge of this notes of value parcel, and is tilted forwards, as represented schematically in FIG. 5. During this tilting motion, the notes of value parcel is guided within the bent section 5a of the spring bar, is thereupon stood up into its on-edge position, is turned upside down over the stops 6 and is deposited, turned under the influence of the spring force of the spring bar, on the conveyor track, whereupon it is taken up again by the original slides 3b.

Upon the notes of value parcel being stood upright and upon its on-edge position being passed, the spring bar 5 is bent upwards by the notes of value parcel, so that the spring force acting upon the notes of value parcel initially increases somewhat and then eases off again. It is essential that, during the turning, the notes of value parcel should be forcibly guided by the shape of the bent spring section and the constantly acting spring force and should thus execute a defined tilting motion.

Figure 5:
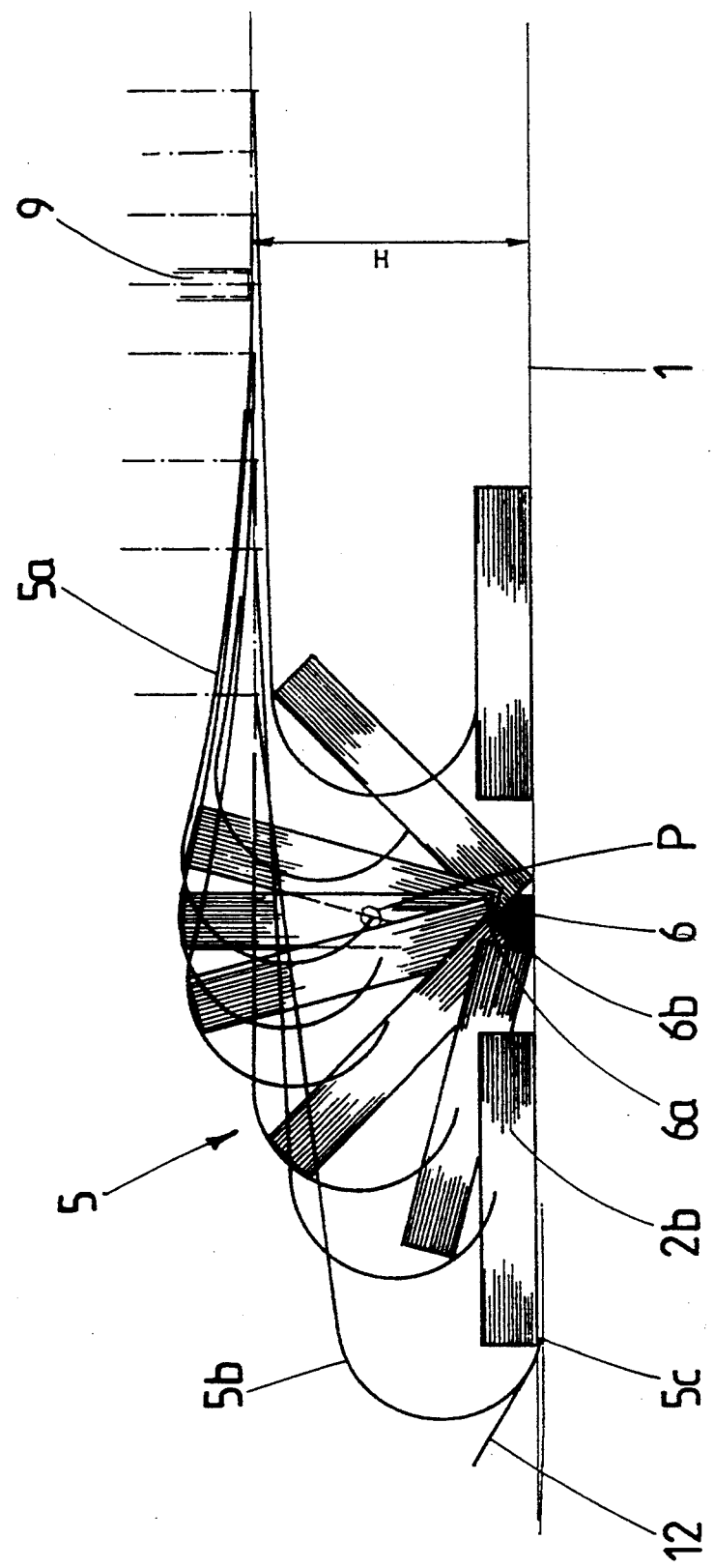
FIG. 5 shows a representation illustrating successive positions of a flat object and of the spring bar during a turning operation.

It can be seen from FIG. 5 that the spring end 5c only comes to bear against the back of the notes of value parcel and only supports the turning operation once the notes of value parcel has rotated more than 90°, i.e. beyond its on-edge position. This location at which the spring end 5c hits against the notes of value parcel is denoted in FIG. 5 by the point P.

The tipping-up of the notes of value parcel out of the on-edge position is effected in the forward direction, i.e. not only under the influence of gravity, but also under the influence of the spring force.

That face 6b of the stops 6 which is oriented perpendicular to the conveyor track prevents the front edge of the notes of value parcel from being able, during the first phase of the tilting motion, to slide up on the inclined stop face 6a and, at the same time, upon the upward tilting of the notes of value parcel, the horizontal edge forms a type of tilt axis between the perpendicular face 6b and the inclined face 6a of the stops. Furthermore, the two symmetrically inclined faces 6a of the stops support a correct tilting motion, which is ensured by a suitable adjustment of the height H and of the spring force of the spring bar 5 in dependence on the size and weight of the object to be turned. This adjustment is not however very critical.

Once the spring bar has assumed its end position (FIG. 3), the notes of value parcel lies turned flat on the conveyor track 1 and the spring bar 5 is supported by its end 5c on this notes of value parcel before its return motion into its initial position is effected. The said spring bar hereupon slides over the following notes of value parcel 2c and into its initial position represented in FIG. 1, in which position the spring end 5c is located behind this notes of value parcel 2c, whereupon this following notes of value parcel 2c, as described, is turned and then taken up again by the original slides 3c for onward transportation.

To enable the spring bar, in its return motion, to slide more easily over a notes of value parcel, there is fastened to the end of this spring bar an inclined abutting plate 12.

As a result of the operation of the turning apparatus according to the invention, the correct sequence of the notes of value parcels is not altered after being turned on the conveyor track, nor does the turning operation give rise to any loss of time in the transportation. Naturally, the apparatus according to the invention can be used to turn any chosen flat objects and is not limited to the described illustrative embodiment, but rather allows a multitude of variants, especially in respect of the configuration of the stop(s) and of the spring bar, in respect of their fastening and in respect of the means for adjusting the spring pretensioning.

What is claimed is:

1. An apparatus for turning flat objects (2a, 2b) such as notes of value parcels, said apparatus comprising:
    a conveyor track (1) having a turning zone and disposed in a plane of conveyance;
    a plurality of slides (3a, 3b, 3c) for transporting said objects uniformly as conveyed material along said track at a speed of conveyance in a direction of conveyance, said objects being spaced at a preselected distance along said conveyor track, and each having a rear edge, a front edge, an object length defined between said front and rear edges and an object height;
    an advancement member;
    drive means for moving said advancement member approximately in parallel to said conveyor track to accelerate said objects along said turning zone relative to said speed of conveyance, said advancement member being moved periodically forward in a first movement from a starting position to an end position and in a second movement back to said starting position during a period of motion defined by the quotient of said preselected distance and said speed of conveyance; and
    turning means for turning one of said objects in said turning zone, said turning means including a first fixed stop (6) protruding above said plane of conveyance, said first fixed stop having a stop height smaller than said object height and a first face pointing in a first direction opposite said conveyance direction, said first face including an upper region (6a) inclined toward said conveyance direction;
    wherein said advancement member includes a spring bar (5) having a bent section (5b) reaching down to said conveyor track (1) and having a concave section pointing in said direction of conveyance and terminating in a first end (5c), said first end during said first movement being arranged to grip the rear edge of one object; and
    wherein said first stop cooperates with said advancing means to raise the rear edge of said one object when said front edge of said one object impacts against said first stop, to guide said rear end within said bent section (5b), and tilt said one object over said first stop to turn and deposit said one object on said conveyor track (1).

2. The apparatus of claim 1 wherein said stop height is about ½ to 9/10 of said object height and wherein said upper region is disposed at an angle of between 30° and 60° with respect to said plane of conveyance.

3. The apparatus of claim 2 wherein said stop height is about ⅔ of said object height.

4. The apparatus of claim 2 wherein said angle is around 45°.

5. The apparatus of claim 1 wherein said face has a lower region (6b) oriented perpendicularly to said plane of conveyance, said lower region having a lower region height measuring about 1/5 to 3/5 of said stop height.

6. The apparatus of claim 5 wherein said lower region height is about ½ of said stop height.

7. The apparatus of claim 1 wherein said first stop includes a second face with a second upper region inclined with respect to said plane of conveyance, said first and second faces defining a prism.

8. The apparatus of claim 1 wherein said bent section (5b) has the shape of a circular arc having a diameter measuring about 3/5 to 4/5 of said object length.

9. The apparatus of claim 8 wherein said diameter is 2/3 of said object length.

10. The apparatus of claim 1 wherein said spring bar is constructed and arranged to move upward away from said conveyor track as said object is turned.

11. The apparatus of claim 1 wherein said advancement member further includes a tie bar and said spring bar has a second end pointing in said conveyance direction which second end juts over said conveyor track (1) and is fastened at a fastening point to said tie bar, said spring bar further including a rectilinear section (5a) extending from said second end to said bent section (5b).

12. The apparatus of claim 11 wherein said fastening point is disposed at a fastening point height above said conveyor track, said fastening point height being less than said object length.

13. The apparatus of claim 1 further comprising pretension means for pretensioning said spring bar toward said conveyor track, said pretensioning means including an adjusting device having a screw (9).

14. The apparatus of claim 13 wherein said pretensioning means pretensions said spring bar at a pretension point, said pretention point being disposed at a pretention height above said conveyor track, said pretention point height being less than said object length.

15. The apparatus of claim 14 wherein said object length is in the range of 5 to 15 mm and wherein said pretention point height does not exceed 10 mm.

16. The apparatus of claim 11 further comprising pretention means for pretensioning said spring bar toward said conveyor track, said pretensioning means including an adjusting device having a screw (9).

17. The apparatus of claim 1 wherein said spring bar further includes an inclined abutting plate (12) fastened to said first end (5c) which extends in said first direction, said plate causing said spring bar to slide over said one object during said second movement.

18. The apparatus of claim 1 further comprising a second fixed stop, said first and second stops being aligned transversely across said conveyor track.

19. The apparatus of claim 18 wherein said one object has a transverse dimension in a direction transversal to said direction of conveyance, and wherein said stops are disposed at a distance equal to about 1/10 to 2/10 of said transverse dimension.

20. The apparatus of claim 1 wherein said conveyor track is formed with a one slot (4) with said slides passing through said slot, and wherein said conveyor track further includes two border regions disposed laterally of said slots, said stops being disposed on said border regions.

21. The apparatus of claim 1 wherein said one object has a transverse dimension in direction transversal to said direction of conveyance and said spring bar has a spring bar width transversal to said direction of conveyance and equal to about 15% to 30% of said transverse dimension.

22. The apparatus of claim 21 wherein said spring bar width is about 20% of said transverse dimension.

* * * * *